(12) United States Patent
Bell et al.

(10) Patent No.: US 7,716,963 B2
(45) Date of Patent: May 18, 2010

(54) METHOD AND APPARATUS FOR PROVING FLOW METERS

(75) Inventors: Mark James Bell, Arvada, CO (US); Brian T. Smith, Johnstown, CO (US)

(73) Assignee: Micro Motion, Inc., Boulder, CO (US)

( * ) Notice: Subject to any disclaimer, the term of this patent is extended or adjusted under 35 U.S.C. 154(b) by 500 days.

(21) Appl. No.: 11/573,981

(22) PCT Filed: Aug. 24, 2004

(86) PCT No.: PCT/US2004/027497

§ 371 (c)(1),
(2), (4) Date: Feb. 20, 2007

(87) PCT Pub. No.: WO2006/022742

PCT Pub. Date: Mar. 2, 2006

(65) Prior Publication Data

US 2009/0013753 A1 Jan. 15, 2009

(51) Int. Cl.
*G01F 25/00* (2006.01)
*G01F 1/84* (2006.01)

(52) U.S. Cl. .................... 73/1.34; 73/1.23
(58) Field of Classification Search ........ 73/1.17–1.23, 73/1.34; 702/100
See application file for complete search history.

(56) References Cited

U.S. PATENT DOCUMENTS

| | | | |
|---|---|---|---|
| 3,028,744 A * | 4/1962 | Bagwell et al. | 73/1.24 |
| 3,187,551 A * | 6/1965 | Hill | 73/1.27 |
| 3,250,113 A * | 5/1966 | Rush | 73/1.24 |
| 5,012,667 A * | 5/1991 | Kruse | 73/1.34 |
| 5,072,416 A | 12/1991 | Francisco, Jr. et al. | |
| 5,460,053 A * | 10/1995 | Lew et al. | 73/861.356 |
| 5,774,378 A | 6/1998 | Yang | |
| 6,594,613 B1 | 7/2003 | Ley et al. | |
| 7,373,798 B2 * | 5/2008 | Cotton | 73/1.34 |
| 7,395,690 B2 * | 7/2008 | Cotton | 73/1.19 |
| 7,628,084 B2 * | 12/2009 | Schlosser et al. | 73/861.355 |
| 2002/0198668 A1 | 12/2002 | Lull et al. | |
| 2006/0265148 A1 * | 11/2006 | Stack et al. | 702/45 |
| 2007/0245832 A1 * | 10/2007 | Schlosser et al. | 73/861.01 |

FOREIGN PATENT DOCUMENTS

| | | | | |
|---|---|---|---|---|
| JP | 58108409 A | * | 6/1983 | 73/861.03 |
| SU | 792143 B | * | 1/1981 | |

OTHER PUBLICATIONS

Omni; "Microprocessor Based Flowmeters"; 2001; 4 pages; Omni Flow Computers; United States.
Godfrey, Mark and McCartney, Alan; "Meters Present Interface Challenges"; 4 pages; Omni Flow Computers, Inc.; Stafford, Texas, United States.

* cited by examiner

*Primary Examiner*—Thomas P Noland
(74) *Attorney, Agent, or Firm*—The Ollila Law Group LLC

(57) ABSTRACT

A method and apparatus is disclosed that determines the time delay (202) between the actual flow and the measured flow in a flow meter. The time delay is used to shift the flow measured by the flow meter to correspond to the actual flow measured by a prover or calibration system. In this way an accurate comparison is made between the flow measured by the flow meter and the flow provided by the prover.

20 Claims, 5 Drawing Sheets

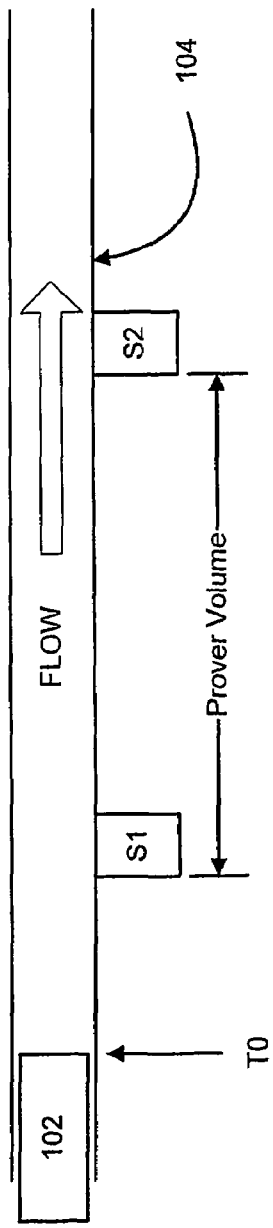
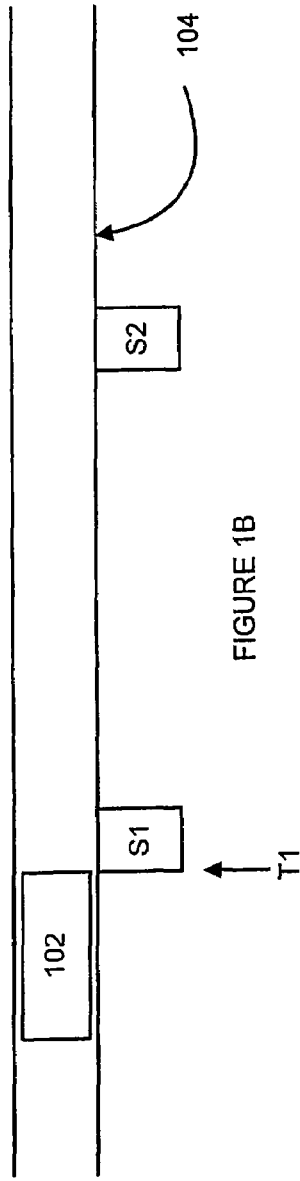
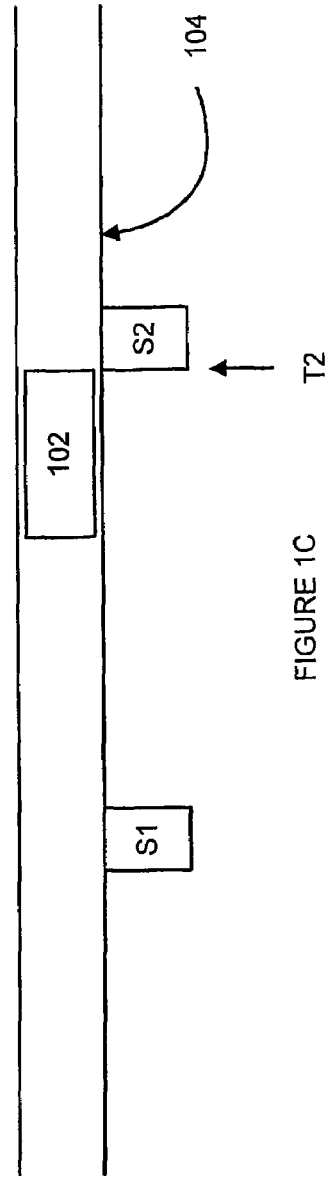

US 7,716,963 B2

METHOD AND APPARATUS FOR PROVING FLOW METERS

BACKGROUND OF THE INVENTION

1. Field of the Invention

The invention is related to the field of flow meters, and in particular, to proving flow meters.

2. Description of the Prior Art

Coriolis flow meters are "synthesized pulse devices" as defined by the American Petroleum Industry (API). This simply means that it takes a finite amount of time to calculate the flow that has passed through the meter. In a typical Coriolis flow meter, it takes a short but measurable time to calculate the flow that has passed through the meter. This causes a time delay between the actual flow and the measured flow. The results of the time delay is a flow reading that is offset or delayed from the actual flow by the time delay. In most uses this delay does not cause problems because at the end of the batch, after waiting a short time, the correct value for flow through the meter is available.

Proving is a field calibration method where a known volume is flowed through the flow meter and compared to the flow measured by the flow meter. Provers can be stationary, e.g. mounted permanently next to the meter, or truck mounted so that the prover can calibrate a plurality of meters. A typical prover is a device with a pipe (104) of a known internal diameter. A ball or piston (102) slides inside the pipe (104) and passes two sensors (S1,S2) or detectors. The first sensor (S1) signals the prover's computer to start counting pulses from the flow meter being calibrated. The pulses are typically proportional to volume flow rate. The second sensor (S2) signals the prover to stop counting pulses from the meter being calibrated. The volume inside the pipe between the two detectors is well known and often compensated for pressure and temperature. The total volume between the two detectors is compared to the number of pulses from the flow meter and a meter factor is determined. The meter factor is simply a correction factor applied to the meter's output. Depending on the volume of the prover and the flow rate used, the measurement time for the known volume to pass through the flow meter may be from 0.5 seconds to 60 seconds. This procedure works well for many types of flow meters (turbine meter, PD meter, etc.) but may have problems with synthesized pulse devices due to the time delay in the measured flow. Because the measured flow is offset in time from the actual flow, the prover is comparing flow volumes from different instances in time.

Any change in flow rate during the calibration test can cause a difference in the measured flow between the different instances in time. One cause of flow rate change is when the prover launches the ball or piston. A change in pressure may occur when the ball or piston is launched, causing a change in flow rate. The prover measures the new flow rate, and the Coriolis flow meter measures a weighted average of the old flow rate and the new flow rate, causing an error between the two measurements. Provers often have a length of pipe that the ball or piston travels before crossing the first detector. This length of pipe is typically called the "prerun". The prerun length is equivalent to a fixed volume. The prerun time is dependent on flow rate. At high flow rates, the prerun time may not be long enough to completely stabilize the flow rate. Even at low flow rates, the flow rate through the prover may not be completely stable. This is not a problem for many types of flow meters but it may cause an error when proving a synthesized pulse devices.

Therefore there is a need for a system and method for proving synthesized pulse devices.

SUMMARY OF THE INVENTION

A method and apparatus is disclosed that determines the time delay between the actual flow and the measured flow in a flow meter. The time delay is used to shift the flow measured by the flow meter to correspond to the actual flow measured by a prover. In this way an accurate comparison is made between the flow measured by the flow meter and the flow provided by the prover.

Aspects

One aspect of the invention includes, a method, comprising:

determining a time delay between an actual flow rate and a measured flow rate in a flow meter;

providing the time delay to a proving device used to prove the flow rate of the flow meter.

Preferably, the method further comprises where the time delay is determined by introducing perturbations in a flow and measuring how long before the perturbations are detected by the flow meter.

Preferably, the method further comprises where time delay is determined by calculating the delay due to electronics and filtering in the flow meter.

Preferably, the method further comprises where flow meter is a Coriolis flow meter.

Another aspect of the invention comprises a method, comprising:

providing a flow of a known quantity of material, over a first time period, to a flow meter;

receiving measured flow data, for a second time period, from the flow meter;

receiving a delay time from the flow meter where the delay time is the time different between the measured flow and the provided flow in the flow meter;

shifting the measured flow data from the flow meter by the delay time.

Preferably, the method further comprises where the shifting amount is a function of a damping amount in the flow meter.

Preferably, the method further comprises where the shifting occurs by delaying a start and stop signal that indicate a beginning and an end of the first time period.

Preferably, the method further comprises where the flow meter is a Coriolis flow meter.

Another aspect of the invention comprises a method, comprising:

setting a plurality of measurement parameters for a flow meter;

determining a time delay between an actual flow rate and a measured flow rate in the flow meter when the flow meter is operating with the set measurement parameters.

Preferably, the method further comprises where the plurality of measurement parameters comprise a damping rate and an operating mode.

Preferably, the method further comprises where the time delay is provided to a prover used for calibration of the flow meter.

Preferably, the method further comprises where flow meter is a Coriolis flow meter.

Preferably, the method further comprises where the time delay is determined by introducing perturbations in a flow and measuring how long before the perturbations are detected by the flow meter.

Preferably, the method further comprises where the time delay is determined by looking up the time delay in a table that maps the plurality of measurement parameters to a time delay.

Another aspect of the invention comprises a prover, comprising:

a section of tubing having a know diameter;
a first sensor at a first location on the section of tubing;
a second sensor at a second location on the section of tubing;
a device configured to move inside the section of tubing between the first location and the second location;
the first and second sensors configured to send a first and second signal, respectively, when the device passes the fast and second locations;
a flow computer configured to receive the first and second signals from the first and second sensors;
the flow computer also configured to receive flow measurements from a flow meter to be calibrated;
the flow computer also configured to receive a delay time from the flow meter to be calibrated, and configured to shift the received flow measurements with respect to the first and second signals by the delay time.

Preferably, the prover where the shifting occurs by delaying the first and second signals from the first and second sensors.

Another aspect of the invention comprises a Coriolis flow meter, comprising:

a conduit configured to contain a flowing material;
at least one driver configured to vibrate the conduit;
sensors configured to measure the position of the vibrating conduit;
electronics configured to receive the measured position of the conduit and convert the measured position into a measured material flow rate;
a storage area configured to store at least one delay time between an actual material flow through the conduit and the measured material flow through the conduit.

Preferably, where the electronics are configured to operate in at least two modes having different operating speeds and where there is a different delay time stored in the storage area for the two different modes.

Preferably, where the electronics are configured to operate with at least two damping rates and where there is a different delay time stored in the storage area for the at least two damping rates.

Another aspect of the invention comprises a Coriolis flow meter comprising:

a means for vibrating a conduit containing a flowing material;
a means for measuring the phase of the vibrating conduit;
a means for converting the measured phase into a flow measurement;
a means for storing a delay time that indicates the time delay between an actual flow through the meter and the flow measurement.

BRIEF DESCRIPTION OF THE DRAWINGS

FIG. 1A is a block diagram of a prover at the start of a measurement cycle.

FIG. 1B is a block diagram of a prover at time T1 in a measurement cycle.

FIG. 1C is a block diagram of a prover at time T2 in a measurement cycle.

DETAILED DESCRIPTION OF THE PREFERRED EMBODIMENT

Figure 2:
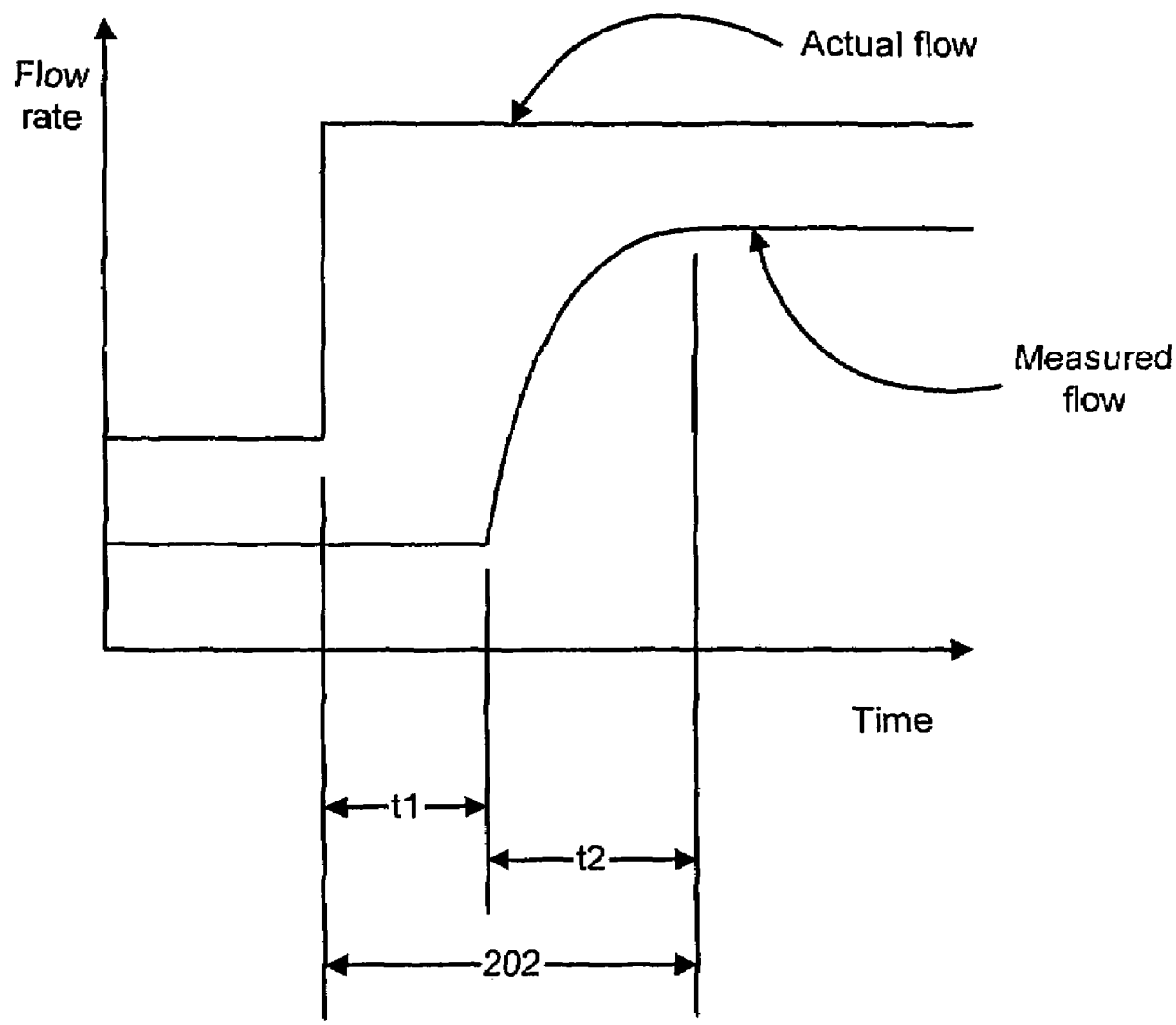
FIG. 2 is a typical response curve from a step change in flow rate for a Coriolis flow meter.

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

A prover typically starts the measurement cycle by starting a material flow into the meter to be calibrated. Once the flow has stabilized the prover releases a ball or piston that travels down the length of the known diameter pipe (See FIG. 1A). After the ball or piston travels the length of the prerun (if any), the first sensor is encountered at time T1 (See FIG. 1B). This triggers the flow computer inside the prover to begin counting pulses (i.e. measuring flow) from the flow meter. The flow computer stops counting pulses from the flow meter when the ball or piston reaches a second sensor at time T2 (See FIG. 1C). The pulses counted between times T1 and T2 are the flow amount measured by the flow meter. The known volume in the pipe between the two sensors is the actual flow amount. The actual flow amount is compared to the measured flow amount to determine the meter calibration. In one example embodiment of the current invention, a delay $\delta$ is added to the first and second sensor signals. The delay time $\delta$ is the delay in the flow meter between the actual flow and the measured flow. This delay is typically caused by meter electronics, damping, vibration mode, and the like. In this embodiment when the ball or piston reaches the first sensor, the sensor signal is not sent until the delay time $\delta$ has passed. The prover does not start counting pulses from the flow meter until the sensor signal is sent. When the ball or piston reaches the second sensor, the sensor signal is not sent until after the delay time $\delta$ has passed. The prover does not stop counting pulses until after the second sensor signal is sent. The total time TT that the pulses are counted remains the same $TT=T1-T2=(T1+\delta)-(T2+\delta)$ however the measurements received from the flow meter have been shifted by an amount $\delta$.

In another example embodiment of the invention, the delay time $\delta$ would be used by the flow computer in the prover. The flow computer would receive the first and second sensor signals without a delay, but the flow computer would not start or stop counting pulses from the flow meter until the delay time $\delta$ had passed.

It each case the actual flow from the prover is compared to a measured flow from the flow meter that has been shifted in time by $\delta$ amount. When the amount $\delta$ corresponds to the time delay between the measured flow and the actual flow in the flow meter, then the prover would compare the actual flow from the prover to the actual flow through the flow meter. Said another way the prover would measure the volumes from the same instant in time.

The delay time δ may be dependent on the type or revision of the electronics in the flow meter, the flow rate, the flow meter damping, the vibration mode used by the meter, the meter geometry, and the like. The time δ may be different for different meters and for different provers. In one example embodiment of the invention, the time delay would be set for a prover before calibration of a flow meter. The time delay δ is set to zero for meters that do not have a time delay between the measured flow and the actual flow (turbine meter, PD meter, etc.). In one example embodiment of the invention, the user may select the type of flow meter being calibrated. When a flow meter type is selected that has a zero delay, the delay time may automatically be set to zero. When a meter type that has a non-zero delay is selected for testing, the user may be prompted to input the delay time. In another example embodiment of the invention, the flow meter to be calibrated may interact with the prover and automatically provide the proper delay time to the prover.

The delay time for a Coriolis flow meter may be calculated or may be measured. To calculate the delay, you must have an understanding of what causes the delay. FIG. 2 is a typical response curve of the measured flow for a Coriolis flow meter from a step change in actual flow. The measured response can be divided into two parts. The first part, time t1, is a fixed processing delay and is a period of time in which there is no change in the measured output from the Coriolis flow meter. The first time period t1 is typically due to electronic delays. The second part of the response curve, time t2, approximates an RC delay function, which is an exponential function. The second period of time t2 is typically due to filtering delays. The total delay (202) between the change in actual flow and the change in measured flow is the sum of time t1 and t2.

Figure 3:
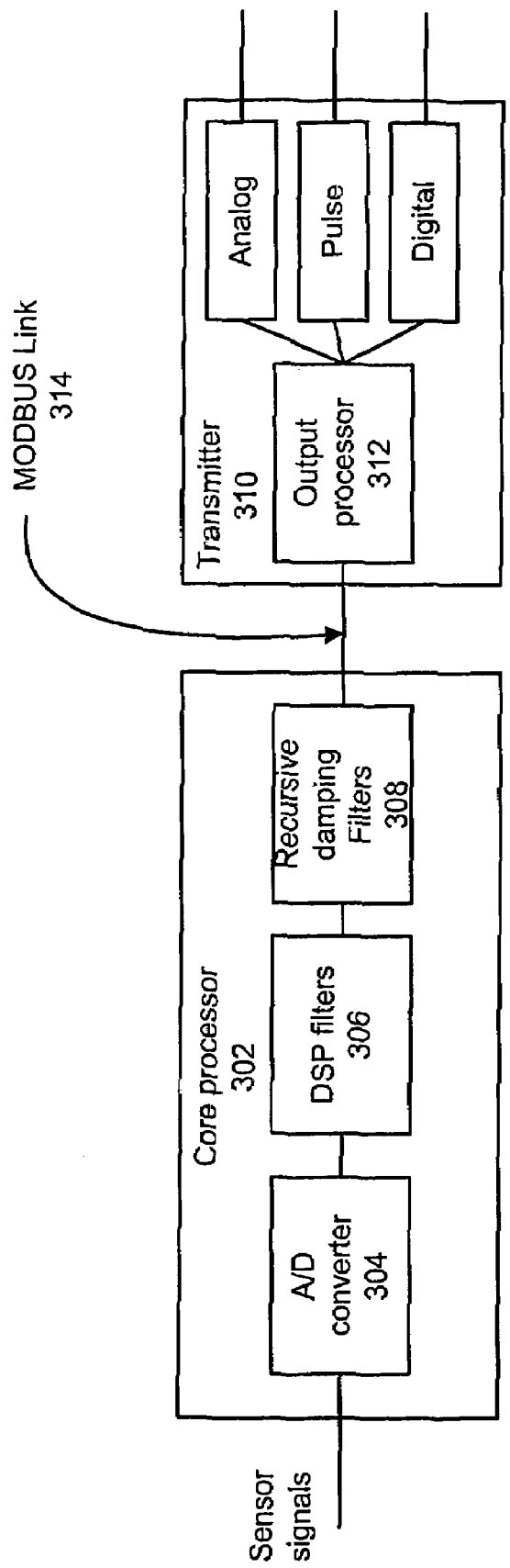
FIG. 3 is a block diagram of the electronics for a typical Coriolis flow meter.

FIG. 3 is a block diagram of the electronics for a Coriolis flow meter. A core processor 302 receives the analog signals from the sensors on the Coriolis flow meter (Not shown). Analog to digital (A/D) converter (304) samples the analog signals and outputs a digital representation of the analog signals. The digital signals are processed in a Digital Signal Processor (DSP) (306). The signals are then filtered by recursive damping filter 308. The user may change the amount of damping used by recursive damping filter 308. The signals are sent from the core processor to a transmitter (310) across a MODBUS (314) link. An output processor (312) in the transmitter (310) converts the signal into user output signals. The fixed processing delay in the response curve includes the processing time of the core processor (302) and the DSP (306), inter processor communications delays across link 314, and delays due to the amount of damping used in the system. The main delays in the system originate from the filtering of the signals and the sampling rate. Other electronic configurations are possible. For example, the core processor and transmitter may be combined into one unit.

Calculating the signal delay due to filtering is well known in the arts. For example, the delay for a $8^{th}$ order elliptic filter with a cutoff at 1500 Hz with sampling at 48 KHz and a decimation of 12 can be broken into two parts, a sample delay and a group delay. The sample delay for the filter can be calculated as: Sample delay=12 (1/48 Khz)=0.25 ms. The group delay can be calculated as:

$$GD = 6.3\left(\frac{1}{2\pi(1500\ Hz)}\right) = 0.67\ ms.$$

The total delay through the filter is the sum of the sample delay and the group delay or 0.25+0.67=0.92 ms. For a multistage filter the delays for each stage are calculated and then the total delay is the sum of the delays for each stage. For complete system response the filter response time must be added to the delay times. The filter response time contributes to the second part of the delay curve (The RC part). The filter response time can be calculated for reaching 63% of the maximum response, 100% of the maximum response, or the like. For the filter from the example above the filter response time is: 0.87 ms (at 63.2%) and 1.02 ms (at 100%). Therefore the total delay due to filtering for the example $8^{th}$ order elliptic filter would be 1.79 ms at 63.2% response and 1.94 ms at 100% response. Calculating the delays through other stages of the electronics is also well known in the arts and is dependent on the operating rates of the electronics, the amount of data to be transmitted, and the like. Some Coriolis flow meter electronics can operates in two modes. The electronics have a normal mode that operates at 20 Hz and a "special" mode that operates at 100 Hz. The delay times when in the special mode are typically shorter due to the faster operating speed. For some Coriolis flow meters the amount of damping done in the filters may be changed. Any change in the damping amount affects the delay between actual flow and measured flow.

In one example embodiment of the invention, a Coriolis flow meter that allows adjustable damping would have different delay time for the different damping amounts. The different delay times could be calculated each time the damping was changed. In another embodiment, there would be a table with the pre-calculated delay times available for each of the different damping amounts.

Figure 4:
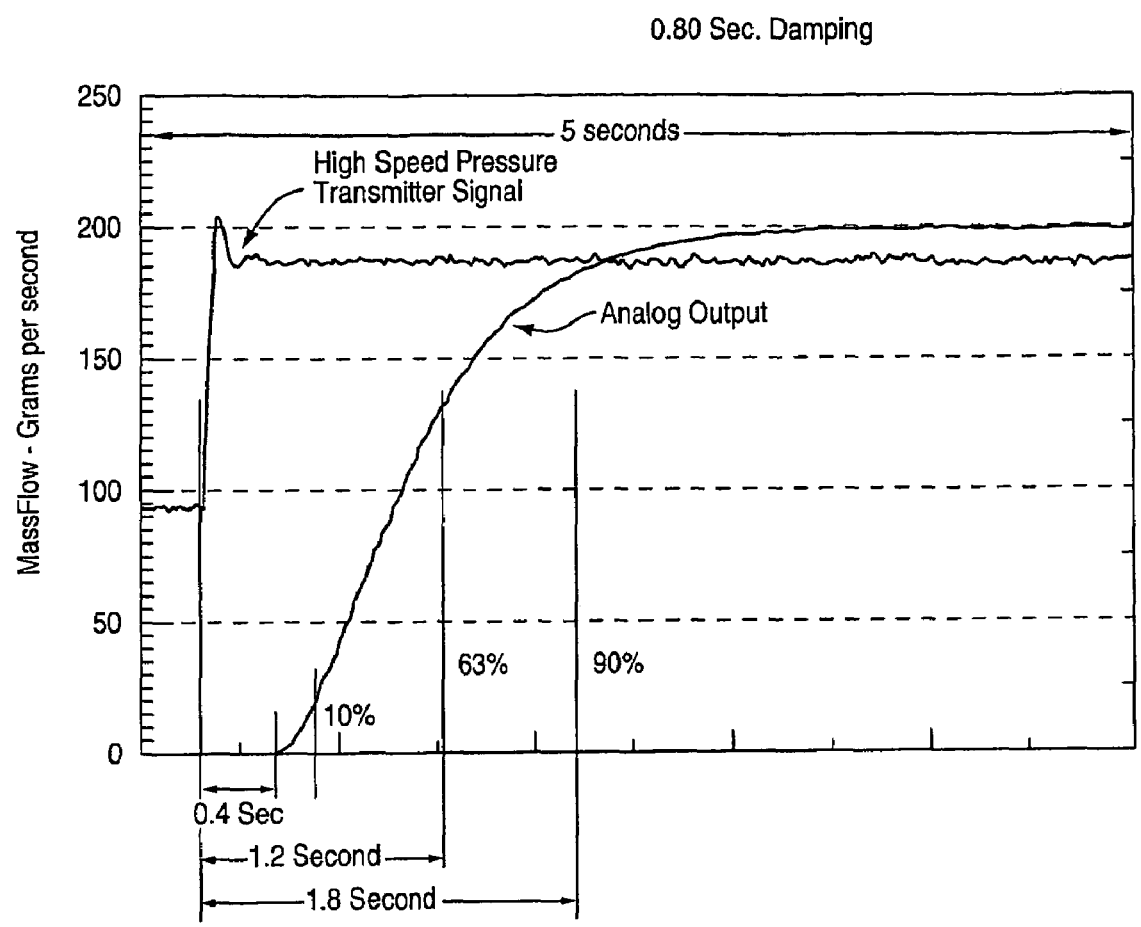
FIG. 4 is a plot of flow rate vs. time for the flow measured using a Coriolis flow meter and for the flow measured using a precision flow stand and high speed electronics.
Figure 5:
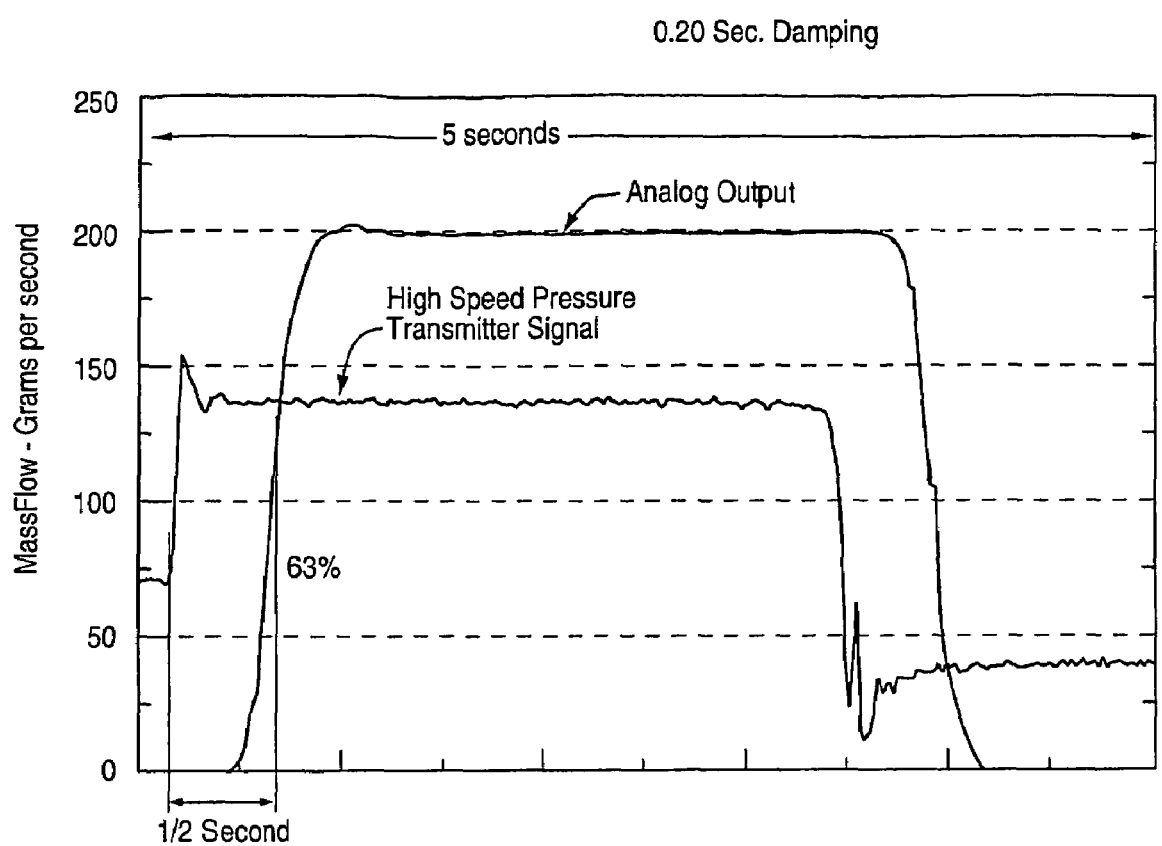
FIG. 5 is a plot of flow rate vs. time for the flow measured using a Coriolis flow meter with the damping changed to 0.2.

Another way to determine the delay times between a change in a flow amount and the measured flow amount is to measure the delay. FIG. 4 is a plot of flow rate vs. time for the flow measured using a Coriolis flow meter and for the flow measured using a precision flow stand and high speed electronics. As can be seen, the flow measured by the high speed pressure transducer has essentially a step change in flow rate. The measured flow rate from the Coriolis flow meter (shown as Analog Output) remains unchanged for approximately 0.4 seconds. The measured flow takes approximately 1.2 seconds to reach 63% of maximum flow and approximately 1.8 seconds to reach 90% of maximum flow. FIG. 4 is a plot of flow rate vs. time for the flow measured using a Coriolis flow meter with the damping changed to 0.2. The response time to reach 63% maximum flow for the Coriolis flow meter has been reduced to approximately 0.5 seconds.

Measurements can be taken for each damping rate and for the different operating modes (i.e. normal and special). The delay times for the different modes and different damping factors can be compiled in a table and included with the Coriolis flow meter. In use, a delay time corresponding to the current flow meter settings may be displayed by the meter or provided directly to a prover. Using the delay time, the prover can shift the measured flow to correspond with the provided flow, allowing more accurate proving of the flow meter.

In the descriptions above, the invention was described using a Coriolis flow meter. As well understood in the art, the current invention may be used in other synthesized pulse devices and is not limited to Coriolis flow meters.

We claim:

1. A method for proving a flow meter, comprising:
   determining a time delay between an actual flow rate and a measured flow rate in the flow meter;
   providing the time delay from the flow meter to a prover;
   proving the flow meter with the prover using the time delay.

2. The method of claim 1 where the time delay is determined by introducing perturbations in a flow and measuring how long before the perturbations are detected by the flow meter.

3. The method of claim 1 where the time delay is determined by calculating the delay due to electronics and filtering in the flow meter electronics.

4. The method of claim 1 where proving the Coriolis flow meter further comprises,
providing a flow of a known quantity of material, over a first time period, to the flow meter;
receiving measured flow data, for a second time period, from the flow meter where the second time period is offset from the first time period by the time delay;
shifting the measured flow data from the flow meter by the time delay.

5. The method of claim 4 where the shifting amount is a function of a damping amount in the flow meter.

6. The method of claim 4 where the shifting occurs by delaying a start and stop signal that indicate a beginning and an end of the first time period.

7. The method of claim 1 where the time delay is determined by looking up the time delay in a table that maps the plurality of measurement parameters to a time delay.

8. The method of claim 1 where the shifting amount is a function of an operating rate of the flow meter.

9. The method of claim 1 where the flow meter comprises a Coriolis flow meter.

10. A prover, comprising:
a section of tubing (104) having a know diameter;
a fast sensor (S1) at a first location on the section of tubing;
a second sensor (S2) at a second location on the section of tubing;
a device (102) configured to move inside the section of tubing (104) between the first location and the second location, the first and second sensors configured to send a first and second signal, respectively, when the device passes the first and second locations; and
a flow computer configured to receive the first and second signals from the first and second sensors, receive flow measurements from a flow meter to be calibrated, receive a delay time from the flow meter to be calibrated, and shift the received flow measurements with respect to the first and second signals by the delay time.

11. The prover of claim 10 where the shifting occurs by delaying the first and second signals from the first and second sensors.

12. The prover of claim 10 where the prover receives the delay time having a first value when the flow meter electronics are operating in a fast mode and the prover receives the delay time having a second value when the flow meter electrodes are operating in a second mode.

13. The prover of claim 12 where the flow meter electronics operate at a fast speed in the first mode and operate at a second speed when in the second mode.

14. The prover of claim 12 where the flow meter electronics have a first damping rate in the first mode and have a second damping rate when in the second mode.

15. The prover of claim 10 where the time delay is determined by introducing perturbations in a flow and measuring how long before the perturbations are detected by the flow meter.

16. The rover of claim 10 where the time delay is determined by looking up the time delay in a table that maps the plurality of measurement parameters to a time delay.

17. The prover of claim 10 where the time delay is determined by calculating the delay due to electronics and filtering in the flow meter electronics.

18. The prover of claim 10 where proving the Coriolis flow meter further comprises,
providing a flow of a known quantity of material, over a first time period, to the flow meter;
receiving measured flow data, for a second time period, from the flow meter where the second time period is offset from the first time period by the time delay;
shifting the measured flow data from the flow meter by the time delay.

19. The rover of claim 18 where the shifting occurs by delaying a start and stop signal that indicate a beginning and an end of the first time period.

20. The prover of claim 10 where the flow meter comprises a Coriolis flow meter.

* * * * *

UNITED STATES PATENT AND TRADEMARK OFFICE
CERTIFICATE OF CORRECTION

| | | |
|---|---|---|
| PATENT NO. | : 7,716,963 B2 | Page 1 of 1 |
| APPLICATION NO. | : 11/573981 | |
| DATED | : May 18, 2010 | |
| INVENTOR(S) | : Mark James Bell and Brian T. Smith | |

It is certified that error appears in the above-identified patent and that said Letters Patent is hereby corrected as shown below:

Column 3, line 14 replace "fast" with --first--

Column 4, line 60 replace "It" with --In--

Column 7, line 31 replace "fast" with --first--

Column 8, line 8 replace "fast" with --first--

Column 8, line 12 replace "fast" with --first--

Column 8, line 21 replace "rover" with --prover--

Column 8, line 36 replace "rover with --prover--

Signed and Sealed this
Twenty-second Day of February, 2011

David J. Kappos
*Director of the United States Patent and Trademark Office*